(12) United States Patent
Lim

(10) Patent No.: US 12,191,467 B2
(45) Date of Patent: Jan. 7, 2025

(54) BATTERY MODULE COOLING STRUCTURE

(71) Applicant: HYUNDAI MOBIS Co., Ltd., Seoul (KR)

(72) Inventor: Young Bok Lim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 53 days.

(21) Appl. No.: 17/533,493

(22) Filed: Nov. 23, 2021

(65) Prior Publication Data

US 2022/0166087 A1 May 26, 2022

(30) Foreign Application Priority Data

Nov. 23, 2020 (KR) .................. 10-2020-0158120

(51) Int. Cl.
| | |
|---|---|
| *H01M 10/6556* | (2014.01) |
| *H01M 10/613* | (2014.01) |
| *H01M 10/625* | (2014.01) |
| *H01M 50/204* | (2021.01) |
| *H01M 50/244* | (2021.01) |
| *H01M 50/249* | (2021.01) |

(52) U.S. Cl.
CPC ..... *H01M 10/6556* (2015.04); *H01M 10/613* (2015.04); *H01M 10/625* (2015.04); *H01M 50/204* (2021.01); *H01M 50/244* (2021.01); *H01M 50/249* (2021.01); *H01M 2220/20* (2013.01)

(58) Field of Classification Search
CPC ........... H01M 10/6556; H01M 10/613; H01M 10/625; H01M 50/249; H01M 50/244; H01M 50/204; H01M 2220/20
See application file for complete search history.

(56) References Cited

U.S. PATENT DOCUMENTS

| | | | |
|---|---|---|---|
| 2012/0055725 A1 | 3/2012 | Mizoguchi et al. | |
| 2012/0121959 A1 | 5/2012 | Yamada | |
| 2014/0322583 A1* | 10/2014 | Choi ................. | H01M 10/6555 429/120 |
| 2015/0349394 A1* | 12/2015 | Hayashida ........ | H01M 10/6556 429/120 |
| 2018/0170206 A1 | 6/2018 | Kim et al. | |
| 2019/0372185 A1* | 12/2019 | Sekiya ............... | H01M 10/613 |
| 2021/0119282 A1* | 4/2021 | Wunsche ............... | B60L 50/66 |
| 2021/0159473 A1* | 5/2021 | Han .................... | H01M 50/394 |
| 2022/0087062 A1* | 3/2022 | Kuriyagawa ..... | H01M 10/6556 |

FOREIGN PATENT DOCUMENTS

EP 3584877 A1 * 12/2019 ............. B60L 50/64

* cited by examiner

*Primary Examiner* — Christopher P Domone
*Assistant Examiner* — Jonathan William Estes
(74) *Attorney, Agent, or Firm* — NSIP Law

(57) ABSTRACT

A battery module cooling structure includes a plurality of battery modules, a plurality of cooling blocks arranged adjacent to the battery modules to cool the battery modules, and a cooling passage which passes through the cooling blocks adjacent to each other and in which cooling water flows. Each of the cooling blocks includes an upper panel that closes an upper portion of the cooling block and forms an upper body, a lower panel that is spaced apart from the upper panel and closes a lower portion of the cooling block, and a side wall that extends along a periphery of the lower panel and has an end fixed to the upper panel.

5 Claims, 4 Drawing Sheets

BATTERY MODULE COOLING STRUCTURE

CROSS-REFERENCE TO RELATED APPLICATION

This application claims priority to and the benefit of Korean Patent Application No. 10-2020-0158120, filed on Nov. 23, 2020, the disclosure of which is incorporated herein by reference in its entirety.

BACKGROUND

1. Field of the Invention

The present disclosure relates to a battery module cooling structure, and more particularly, to a battery module cooling structure for uniformly cooling heat generated in a battery module.

2. Discussion of Related Art

In recent years, with increasing interest in environmental protection, instead of an internal combustion engine vehicle using a conventional combustion engine, other types of vehicles that are environmentally friendly and consider fuel efficiency, that is, hybrid vehicles and electric vehicles, are being actively developed.

Since the hybrid vehicles are driven by two power sources including an existing engine and a motor driven by electric energy in conjunction with each other, the hybrid vehicles are positioned as real alternative next-generation vehicles that have been spotlighted mainly in the United States and Japan due to the reduction of environmental pollution caused by exhaust gas and the effect of improving fuel efficiency.

In general, the hybrid vehicles use an engine, which is driven by gasoline or diesel, as a main power source and a motor as an auxiliary power source, travel using the engine as a power source at a predetermined speed or higher, and travel using the motor as a power source during low-speed driving.

Further, the electric vehicles mainly use a motor as a main power source.

Meanwhile, a high-voltage battery module is used as a power source required for driving the motor, and the high-voltage battery module acts as an important factor in a lifetime of the hybrid vehicles as well as the electric vehicles.

Thus, in order to effectively operate such a battery module, the battery module should be managed thoroughly.

However, when a battery according to the related art is used for a long time, heat is generated from the battery, and in particular, in the case of a large-capacity battery, more heat is accompanied by an increase in the amount of current during charging or discharging.

In this case, when the generated heat is not sufficiently removed, the performance of the battery may be degraded, or further, the battery may ignite or explode.

Accordingly, in order to maintain and improve the performance of the battery, cooling of the battery is essential.

That is, in order to guarantee the lifetime and performance of a battery used in an environmental-friendly vehicle, a battery cooling device is used in all environmental-friendly vehicles.

Such a battery cooling device is roughly classified into an air cooling-type using air, a water cooling-type using cooling water, and a refrigerant type using a refrigerant according to a cooling fluid.

Among these, in the water cooling-type using water, for cooling each of a plurality of battery modules, a cooling block in which cooling water flows is disposed below a battery module.

Further, a plurality of cooling blocks are connected to each other through a pipeline including a quick connector and the like.

Further, the cooling water is introduced from an inlet of a battery system, is distributed to the cooling block at a lower end of each battery module, absorbs heat generated in the battery in each cooling block, and is discharged to an outlet of the battery system.

However, in a battery cooling system according to the related art, in the pipeline and the like connected between the cooling blocks in the system, when an external shock or repeated vibration occurs, there are many connection portions which are exposed to the risk of leakage of the cooling water.

In particular, the leaked cooling water as described above has a structure that may remain in the system and thus has a problem in that there is a possibility of occurrence of a short circuit and a fire in a cell and an electronic component.

For the above reason, in the related field, a method capable of securing safety against the leakage of the cooling water by blocking the leakage of the cooling water from a gap between the connection portions of the cooling blocks, such as the pipeline connecting the cooling blocks, is being sought, but no satisfactory results have been obtained so far.

SUMMARY OF THE INVENTION

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a battery module cooling structure includes a plurality of battery modules, a plurality of cooling blocks arranged adjacent to the battery modules to cool the battery modules, and a cooling passage which passes through the cooling blocks adjacent to each other and in which cooling water flows, wherein each of the cooling blocks includes an upper panel that closes an upper portion of the cooling block and forms an upper body, a lower panel that is spaced apart from the upper panel and closes a lower portion of the cooling block, and a side wall that extends along a periphery of the lower panel and has an end fixed to the upper panel.

For each cooling block, the side wall may be coupled to a lower surface of the upper panel in a welding manner.

For each cooling block, a thickness of the lower panel may be in a range of 45% to 50% of a thickness of the upper panel.

Each cooling block may further include a flange part that extends from a periphery of the upper panel, interconnects the upper panels adjacent to each other, and has an inlet hole through which the cooling water is introduced and an outlet hole through which the cooling water is discharged, an inlet pipe coupled to an upper portion of the flange part and through which the cooling water is introduced, and an outlet pipe coupled to the upper portion of the flange part and spaced apart from the inlet pipe and through which the cooling water is discharged.

For each cooling block, the inlet pipe may communicate with the inlet hole, and the outlet pipe may communicate with the outlet hole.

For each cooling block, accommodation part through which the cooling water flows may be disposed between the upper panel and the lower panel.

In another general aspect, a battery module cooling structure includes a plurality of battery modules, a plurality of cooling blocks arranged adjacent to the battery modules to cool the battery modules, a cooling passage which passes through the cooling blocks adjacent to each other and in which cooling water flows, a frame that surrounds peripheries of the plurality of battery modules, and a partition member that is disposed between the plurality of battery modules and forms a boundary between the plurality of battery modules.

A gap maintaining part, which allows the battery module and the cooling blocks to be spaced apart from each other, may extend from an inner surface of the frame.

The cooling blocks may be coupled to a lower portion of the partition member.

The cooling blocks and the partition member may be screw-coupled to each other.

Other features and aspects will be apparent from the following detailed description, the drawings, and the claims.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
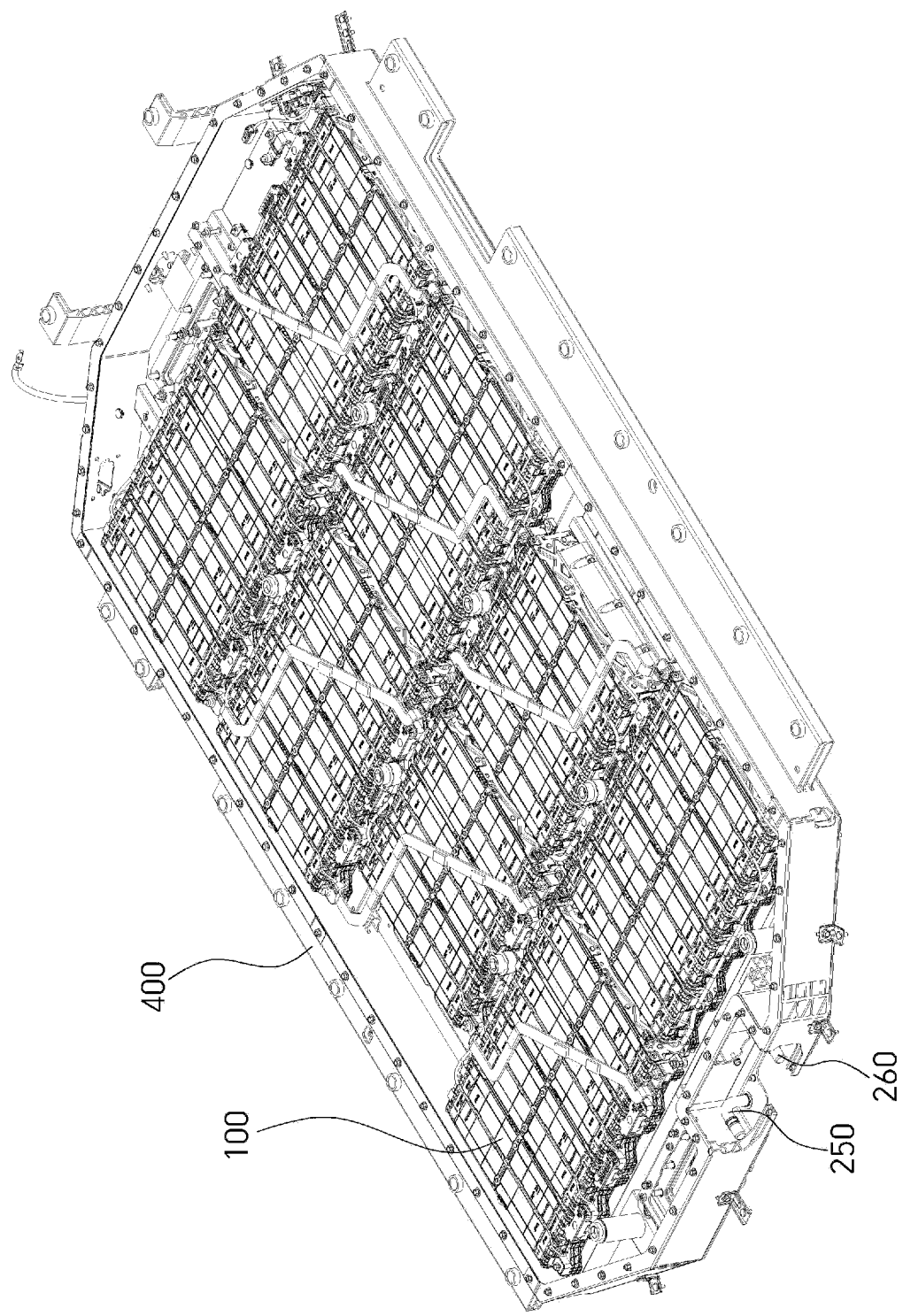
FIG. 1 is a perspective view illustrating a battery module cooling structure according to an embodiment of the present disclosure.

Embodiments of the present disclosure are provided to more completely describe the present disclosure to those skilled in the art, the following embodiments may be modified into various other forms, and the scope of the present disclosure is not limited to the following embodiments. Rather, these embodiments are provided to make this disclosure be more thorough and complete and completely transfer the spirit of the present disclosure to those skilled in the art. Further, in the following drawings, each component is exaggerated for convenience and clarity of description, and the same reference numerals refer to the same components on the drawings. In the present specification, a term "and/or" includes any one or all possible combinations of the listed items.

Terms used herein are used to describe specific embodiments, not to limit the present disclosure.

As used in the present specification, a singular form may include a plural form unless the context clearly indicates otherwise. Further, when used in the present specification, the terms "comprise" and/or "comprising" specify the presence of recited shapes, numbers, steps, actions, members, elements, and/or groups thereof, does not exclude the presence or addition of one or more other shapes, numbers, actions, members, and elements and/or groups.

Hereinafter, exemplary embodiments of the present disclosure will be described in detail with reference to the accompanying drawings.

Figure 2:
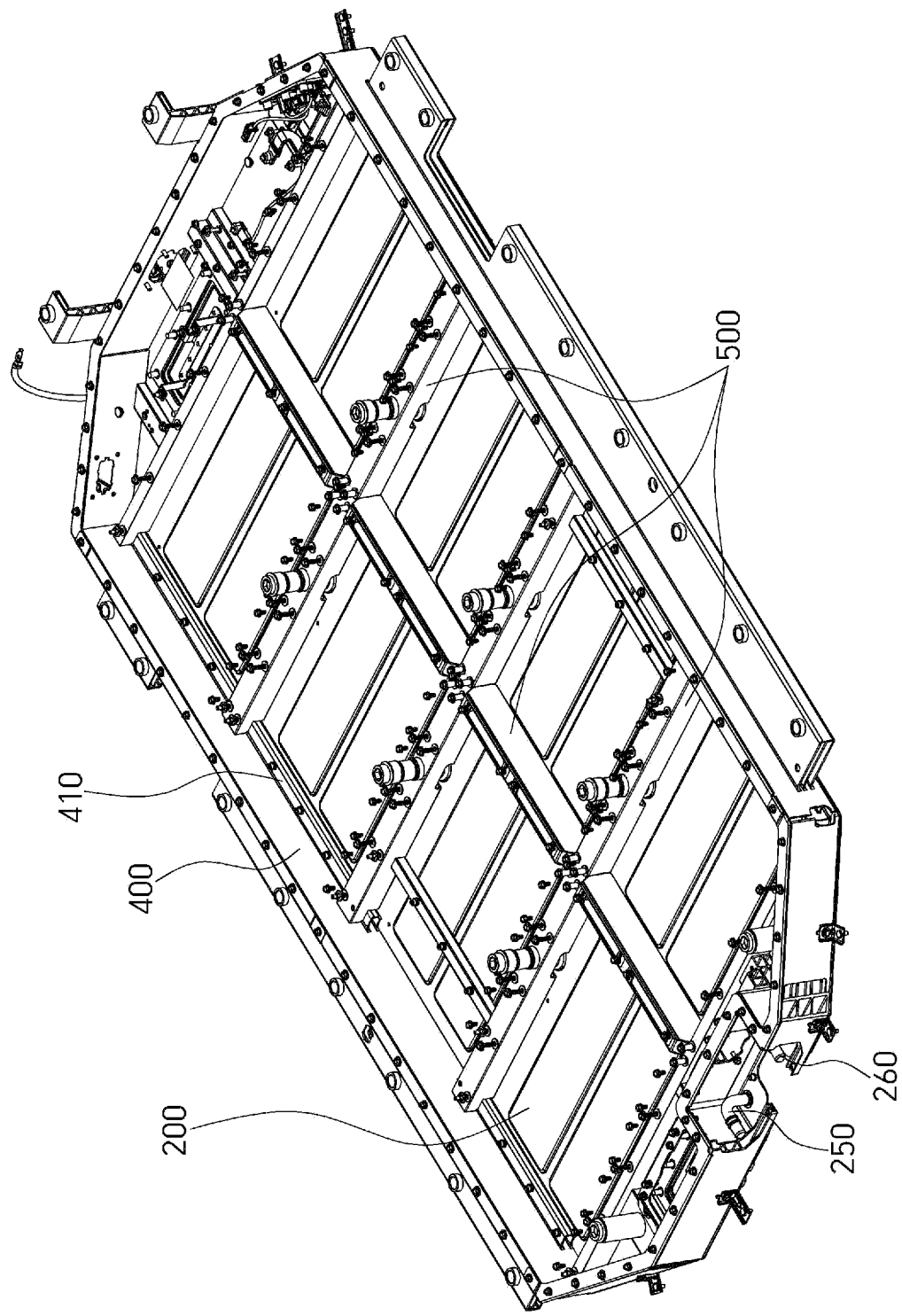
FIG. 2 is a perspective view illustrating a state in which a battery module is removed from the battery module cooling structure according to an embodiment of the present disclosure.
Figure 3:
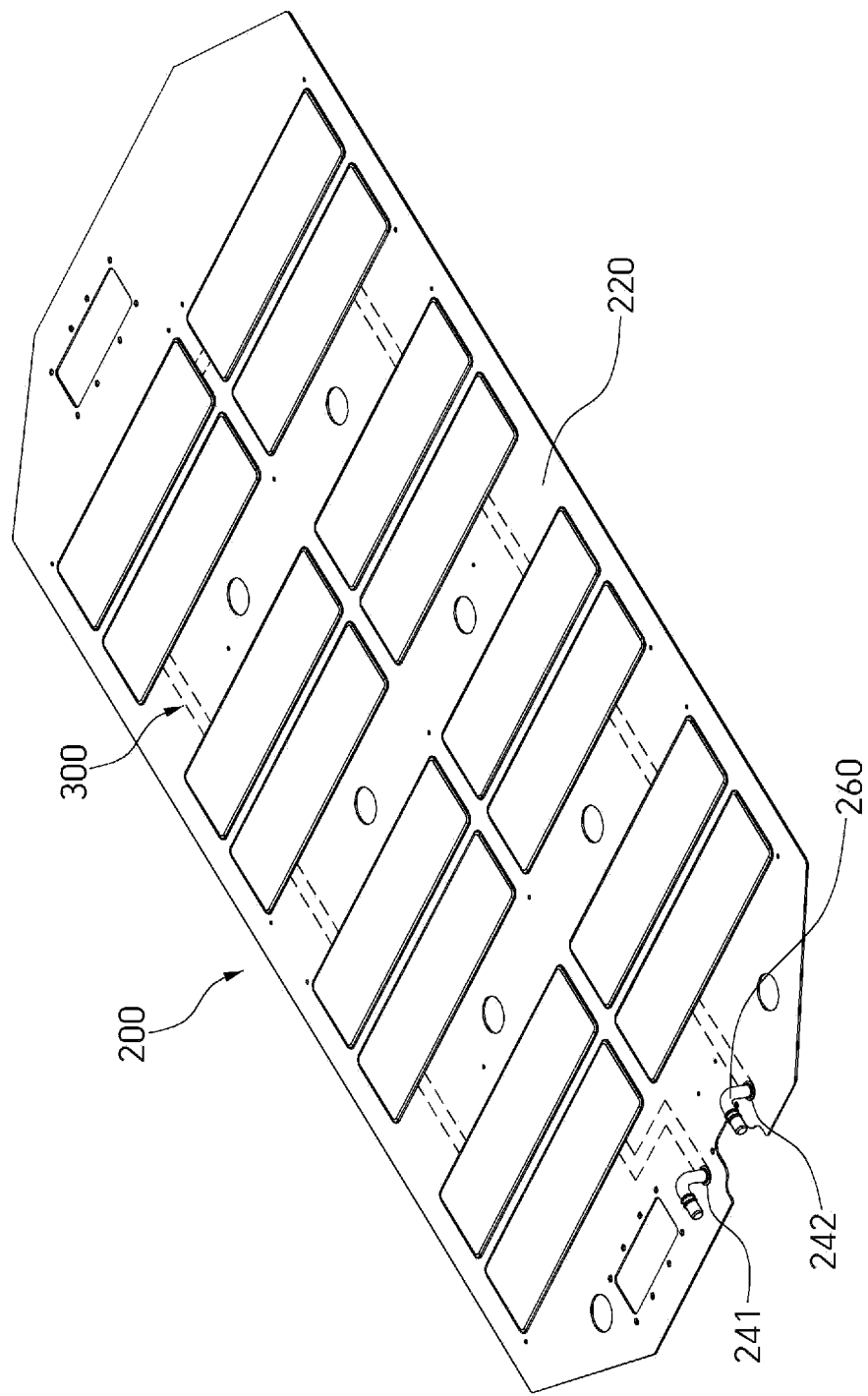
FIG. 3 is a perspective view illustrating a cooling block of a battery module cooling structure according to an embodiment of the present disclosure.
Figure 4:
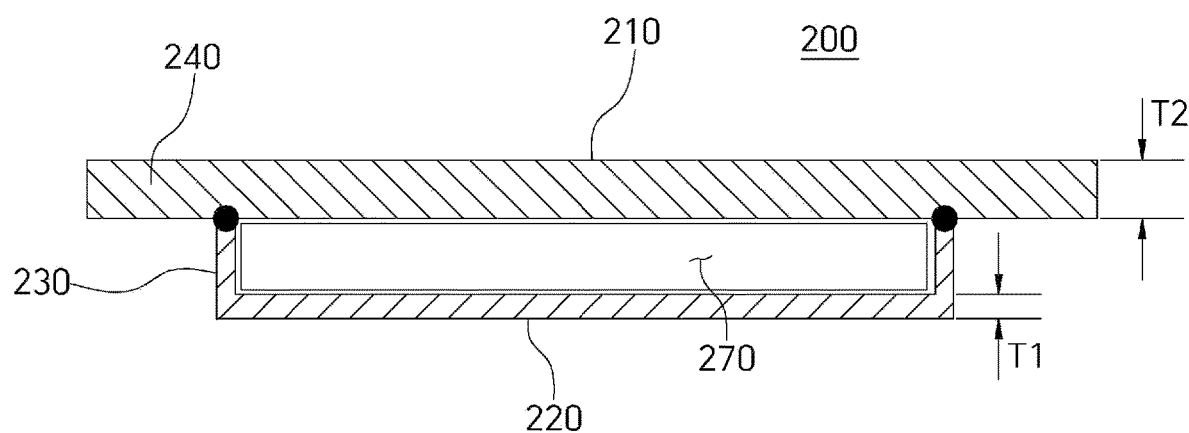
FIG. 4 is a schematic view illustrating a cross-section of a cooling block according to an embodiment of the present disclosure.

FIG. 1 is a perspective view illustrating a battery module cooling structure according to an embodiment of the present disclosure, FIG. 2 is a perspective view illustrating a state in which a battery module is removed from the battery module cooling structure according to an embodiment of the present disclosure, FIG. 3 is a perspective view illustrating a cooling block of a battery module cooling structure according to an embodiment of the present disclosure, and FIG. 4 is a schematic view illustrating a cross-section of a cooling block according to an embodiment of the present disclosure.

Referring to FIGS. 1 to 4, a battery module cooling structure according to the embodiment of the present disclosure includes a battery module 100, a cooling block 200, a cooling passage 300, a frame 400, and a partition member 500.

The battery module 100 is provided as a plurality of battery modules 100, includes a plurality of battery cells and a cover member accommodating the battery cells and is fixed to a vehicle.

The battery module 100 stores power to be supplied to a high-voltage battery system.

The plurality of battery modules 100 are arranged in a horizontal direction.

As illustrated in FIG. 1, when viewed in above, the battery modules 100 may be arranged in two columns and four rows according to a usage environment.

It has been described that the plurality of battery modules 100 are arranged in two columns and four rows, but the present disclosure is not limited thereto, and the battery modules 100 may be arranged in various forms according to the usage environment.

Meanwhile, the battery cell of the present disclosure may be manufactured in various forms and may be manufactured as a pouch type.

The pouch-type battery cell is made in a form that may be easily bent using a flexible aluminum sheet as an exterior member.

The pouch-type battery cell may be formed in a relatively free shape, is light-weight, and thus is mainly used in the battery module 100 for a vehicle in which the plurality of battery cells should be configured.

A plurality of cooling blocks 200 are provided to correspond to the plurality of battery modules 100 and have an independent compartment structure.

Further, the plurality of cooling blocks 200 are provided to cool heat generated by the battery modules 100.

To this end, cooling water for cooling the battery module 100 is introduced into the cooling block 200.

The cooling water flows inside the cooling block 200, and the cooling block 200 absorbs heat generated from the battery cell while a water cooling-type battery module is charged or discharged.

Further, the cooling blocks 200 are arranged below the plurality of battery modules 100 and are formed outside the battery modules 100.

The cooling block 200 includes an upper panel 210, a lower panel 220, a side wall 230, a flange part 240, an inlet pipe 250, and an outlet pipe 260.

The upper panel 210 may have a quadrangular shape, form a body of an upper region of the cooling block 200, and close an upper portion of the cooling block 200.

The lower panel 220 may have a quadrangular shape, form a body of a lower region of the cooling block 200, be spaced apart from the upper panel 210 downward, and close a lower portion of the cooling block 200.

The side wall 230 extends upward along a periphery of the lower panel 220 and has an end fixed to the upper panel 210.

That is, the side wall 230 connects the upper panel 210 and the lower panel 220 to each other and seals a gap between the upper panel 210 and the lower panel 220.

Thus, the side wall 230 connects the upper panel 210 and the lower panel 220 to each other to close the upper panel 210 and the lower panel 220 so that an accommodation part 270 is formed between the upper panel 210 and the lower panel 220 and the side wall 230.

The accommodation part 270 is a space formed between the upper panel 210, the lower panel 220, and the side wall 230, and the cooling water is externally introduced into the accommodation part 270 through an inlet hole 241 and flows in the accommodation part 270.

Accordingly, the heat generated from the battery module 100 disposed above the cooling block 200 can be effectively cooled.

Meanwhile, the side wall 230 is coupled to a lower surface of the upper panel 210 in a welding manner.

Thus, the cooling water accommodated in the accommodation part 270 can be effectively blocked from leaking to the outside of the cooling block 200.

Accordingly, occurrence of accidents such as short circuits and fires due to the cooling water coming into contact with various electronic components in a battery system can be effectively prevented.

Further, the cooling block 200 including the upper panel 210, the lower panel 220, and the side wall 230 is formed in a welding manner, and thus the number of parts man hours, assembly processes, and the like for configuring the battery module cooling structure can be significantly reduced.

Meanwhile, a thickness T1 of the lower panel 220 is 50% or less of a thickness T2 of the upper panel 210 and, preferably, 45% to 50% thereof.

That is, the thickness T1 of the lower panel 220 is formed to be smaller than the thickness T2 of the upper panel 210, and thus when the cooling block 200 is damaged due to an external force or repeated vibration caused by traveling of the vehicle, the lower panel 220 having a relatively small thickness is damaged first.

Accordingly, the cooling water can be effectively prevented from coming into contact with the battery module 100 disposed above the cooling block 200 as the cooling water accommodated inside the cooling block 200 leaks to the outside through the damaged lower panel 220.

The flange part 240 extends from a periphery of the upper panel 210 and interconnects the upper panels 210 adjacent to each other.

That is, the flange part 240 connects the plurality of cooling blocks 200 to each other to form one cooling block 200.

Meanwhile, it has been described that the flange part 240 is formed in the periphery of the upper panel 210, but the flange part 240 may be formed in a periphery of the lower panel 220 and may interconnect the lower panels 220 adjacent to each other as long as the plurality of cooling blocks 200 are integrated into one cooling block 200.

The flange part 240 includes the inlet hole 214 and an outlet hole 242.

The inlet hole 241 is a hole through which the cooling water is introduced externally, and the outlet hole 242 is a hole through which the cooling water introduced through the inlet hole 241 flows inside the cooling block 200, cools the battery module 100, and is then discharged.

Meanwhile, the inlet hole 241 and the outlet hole 242 are formed in a region that does not overlap the battery module 100 disposed above the cooling block 200.

Accordingly, the inlet hole 241 may easily introduce the cooling water externally, and the outlet hole 242 may easily discharge the cooling water.

The inlet pipe 250 is formed in a hollow pipe shape, is coupled to an upper portion of the flange part 240, and allows the cooling water to be introduced into the accommodation part 270.

The inlet pipe 250 communicates with the inlet hole 241 formed in the flange part 240.

Accordingly, the inlet pipe 250 may allow the cooling water to be easily introduced into the accommodation part 270 of the cooling block 200.

The outlet pipe 260 is formed in a hollow pipe shape and coupled to the upper portion of the flange part 240 at a location spaced apart from the inlet pipe 250.

Further, the outlet pipe 260 discharges the cooling water that is introduced from the inlet pipe 250, flows inside the accommodation part 270, and cools the battery module 100.

The outlet pipe 260 communicates with the outlet hole 242 formed in the upper panel 210.

The cooling passage 300, in which the cooling water flows, passes through the cooling blocks 200 adjacent to each other among the cooling blocks 200 so that the cooling water introduced through the inlet pipe 250 and the inlet hole 241 may pass through all of the plurality of cooling blocks 200.

That is, the cooling water is introduced into the accommodation parts 270 of the plurality of cooling blocks 200 by the cooling passage 300.

Accordingly, the plurality of heated battery modules 100 can be cooled by the cooling water introduced into the cooling blocks 200.

Further, the cooling water flows in the plurality of cooling blocks 200 through the cooling passage 300 to cool the plurality of battery modules 100 and is then discharged through the outlet hole 242 and the outlet pipe 260.

The frame 400 is formed in a quadrangular frame shape to surround peripheries of the plurality of battery modules 100, protects the plurality of battery modules 100 from an external force, and allows the battery modules 100 to be easily fixed to a vehicle body.

A gap maintaining part 410 is formed inside the frame 400.

The gap maintaining part 410 extends inward from a lower inner surface of the frame 400 in a lengthwise direction thereof by a predetermined distance.

The gap maintaining part 410 extends from an inner surface of the frame 400 by as much as a thickness of the frame 400.

The gap maintaining part 410 has a lower surface with which an upper surface of the upper panel 210 is in contact and has an upper portion on which the battery module 100 is seated.

That is, the gap maintaining part 410 allows the cooling block 200 and the battery module 100 to be spaced apart from each other by a predetermined distance so as to form a predetermined space between the cooling block 200 and the battery module 100.

Accordingly, the gap maintaining part 410 may allow a water cooling-type cooling structure and an air cooling-type cooling structure to be simultaneously applied to the battery module 100 together with the cooling block 200.

Thus, the water cooling-type cooling structure and the air cooling-type cooling structure are simultaneously applied to the battery module cooling structure according to the present disclosure, and thus the battery module 100 can be more quickly and effectively cooled.

The partition member 500 is formed inside the frame 400 and disposed between the plurality of battery modules 100.

That is, the partition member 500 serves as a boundary line that demarcates between the plurality of battery modules 100.

Further, a thickness of the partition member 500 is greater than a thickness of the gap maintaining part 410.

Further, the cooling block 200 is coupled to a lower portion of the partition member 500.

The partition member 500 is coupled to the cooling block 200 in a screw coupling manner.

That is, the cooling block 200 is disposed below the partition member 500, and a lower surface of the partition member 500 is located at the same height as the lower surface of the gap maintaining part 410.

Thus, as the plurality of battery modules 100 are arranged at correct positions by the partition member 500, when the cooling block 200 and the battery module 100 are assembled, defective assembly can be effectively prevented.

As described above, in the battery module cooling structure according to the present disclosure, as the side wall 230 extending upward from the lower panel 220 is coupled to the lower surface of the upper panel 210 in a welding manner, the cooling water accommodated in the accommodation part 270 can be effectively blocked from leaking to the outside of the cooling block 200.

Accordingly, occurrence of accidents such as short circuits and fires due to the cooling water coming into contact with various electronic components in the battery system can be effectively prevented, and the number of parts man hours, assembly processes, and the like for configuring the battery module cooling structure can be significantly reduced.

Further, the thickness of the lower panel 220 is in the range of 45% to 50% of the thickness of the upper panel 210, and the thickness of the lower panel 220 is smaller than the thickness of the upper panel 210. Thus, when the cooling block 200 is damaged due to an external force or repeated vibration caused by traveling of a vehicle, the lower panel 220 having a relatively small thickness is damaged first, and thus the cooling water accommodated in the cooling block 200 leaks to the outside through the lower panel 220.

Accordingly, the cooling water can be effectively prevented from coming into contact with the battery module 100 disposed above the cooling block 200.

Further, the upper surface of the upper panel 210 is in contact with the lower surface of the gap maintaining part 410, the battery module 100 is seated on the upper portion of the gap maintaining part 410, and the cooling block 200 and the battery module 100 are spaced apart from each other by a predetermined distance. Thus, a predetermined space is formed between the cooling block 200 and the battery module 100, and thus the water cooling-type cooling structure and the air cooling-type cooling structure can be simultaneously applied to the battery module 100 together with the cooling block 200.

According to the present disclosure, a side wall extending upward from a lower panel is coupled to a lower surface of an upper panel in a welding manner, and thus cooling water accommodated in an accommodation part can be effectively blocked from leaking to the outside of a cooling block.

Accordingly, occurrence of accidents such as short circuits and fires due to the cooling water coming into contact with various electronic components in a battery system can be effectively prevented, and the number of parts man hours, assembly processes, and the like for configuring a battery module cooling structure can be significantly reduced.

Further, a thickness of the lower panel is in the range of 45% to 50% of a thickness of the upper panel, and the thickness of the lower panel is smaller than the thickness of the upper panel. Thus, when a cooling block is damaged due to an external force or repeated vibration caused by traveling of a vehicle, the lower panel having a relatively small thickness is damaged first, and thus the cooling water accommodated in the cooling block leaks to the outside through the lower panel.

Accordingly, the cooling water can be effectively prevented from coming into contact with a battery module disposed above the cooling block.

Further, an upper surface of the upper panel is in contact with a lower surface of a gap maintaining part, the battery module is seated on an upper portion of the gap maintaining part, and the cooling block and the battery module are spaced apart from each other by a predetermined distance. Thus, a predetermined space is formed between the cooling block and the battery module, and thus a water cooling-type cooling structure and an air cooling-type cooling structure can be simultaneously applied to the battery module together with the cooling block.

In this way, the embodiments disclosed in the present specification should be considered not from a limiting viewpoint but from an exemplary viewpoint. The scope of the present disclosure is indicated not in the above description but in the appended claims, and all differences within the scope equivalent thereto should be construed as being included in the present disclosure.

What is claimed is:

1. A battery module cooling structure comprising:
   a plurality of battery modules;
   a plurality of cooling blocks arranged adjacent to the battery modules and configured to cool the battery modules; and
   a cooling passage which passes through the cooling blocks adjacent to each other and in which cooling liquid flows,
   wherein each of the cooling blocks comprises:
   an upper panel that closes an upper portion of the cooling block and forms an upper body;
   a lower panel that is spaced apart from the upper panel and closes a lower portion of the cooling block; and
   a side wall that extends along a periphery of the lower panel and has an end fixed to the upper panel, wherein,
   in each cooling block, a thickness of the lower panel is in a range of greater than or equal to 45% to less than 50% of a thickness of the upper panel.

2. The battery module cooling structure of claim 1, wherein, in each cooling block, the side wall is coupled to a lower surface of the upper panel in a welding manner.

3. The battery module cooling structure of claim 1, wherein each cooling block further comprises:
   a flange part that extends from a periphery of the upper panel, interconnects the upper panels adjacent to each other, and has an inlet hole through which the cooling liquid is introduced and an outlet hole through which the cooling liquid is discharged;

an inlet pipe coupled to an upper portion of the flange part and through which the cooling liquid is introduced; and an outlet pipe coupled to the upper portion of the flange part and spaced apart from the inlet pipe and through which the cooling liquid is discharged.

4. The battery module cooling structure of claim 3, wherein, in each cooling block, the inlet pipe communicates with the inlet hole, and the outlet pipe communicates with the outlet hole.

5. The battery module cooling structure of claim 3, wherein, in each cooling block, an accommodation part through which the cooling liquid flows is disposed between the upper panel and the lower panel.

\* \* \* \* \*